United States Patent [19]

Wardlaw et al.

[11] 4,209,226
[45] Jun. 24, 1980

[54] OPTICAL VIEWING INSTRUMENT INCLUDING CAPILLARY TUBE AND HOLDER

[76] Inventors: Stephen C. Wardlaw, 128 Sunset Hill Dr., Branford, Conn. 06405; Robert A. Levine, 31 Pilgram La., Guilford, Conn. 06437

[21] Appl. No.: 5,043
[22] Filed: Jan. 22, 1979
[51] Int. Cl.² .................. G02B 25/02; G02B 21/06
[52] U.S. Cl. ............................. 350/85; 350/87; 350/91; 350/238
[58] Field of Search ............. 350/85, 86, 87, 90, 350/91, 95, 235, 238, 239; 356/244, 246, 440, 73; 250/576

[56] References Cited
FOREIGN PATENT DOCUMENTS
609878 12/1960 Canada ......................... 350/238

OTHER PUBLICATIONS
Someda, C. G., *Bell System Tech. Jour.*, Apr., 1973, pp. 583–596.

Primary Examiner—Jon W. Henry
Attorney, Agent, or Firm—William W. Jones

[57] ABSTRACT

An instrument for viewing samples contained in capillary tubes under optical magnification. The sample-containing capillary tube is disposed in a holder within the instrument wherein the sample is illuminated for viewing. The illumination system allows for epi-illumination or trans-illumination of the sample. The sample holder is a transparent member which has a slot in which the capillary tube is held. Oil or water is disposed in the slot to lessen the lens effect of the curved wall of the transparent capillary tube.

6 Claims, 4 Drawing Figures

OPTICAL VIEWING INSTRUMENT INCLUDING CAPILLARY TUBE AND HOLDER

This invention relates to an instrument which is adapted for use in viewing specimens which are contained in a transparent capillary tube. The instrument is provided with an optical system for appropriate magnification of the sample contained in the capillary tube.

Many optical instruments are available for observing samples under optical magnification. The samples may be positioned on a slide, in a planar form, during observation, or they can be disposed in a capillary tube, or the like, during observation. Instruments such as microscopes, which use slide-mounted specimens, are utilized to observe the nature of the components of a specimen sample and can be used to observe cellular structure, to determine the presence or absence of parasites, and the like. On the other hand, instruments which are utilized to observe capillary tube-contained specimens are generally restricted to uses wherein the amount of a material constituent is being measured because the curved surface of the capillary tube produces a lensing effect which restricts the degree to which one can see into the specimen contained in the tube and view material constituents of the specimen. For example, in the blood testing field, if one were to take an hematocrit count, that test would be made on a blood sample contained in a capillary tube, but if one were performing a test wherein the nature of the red cells had to be examined, rather than their mere quantity, the blood sample would normally be mounted on a slide.

The instrument of this invention is particularly designed for examining specimens which are contained in capillary tubes; however, provision is made for examining, to some degree, the characteristics of the specimen components. For example, the cellular characteristics of a blood sample contained in a capillary tube can be examined with the instrument of this invention, and the presence or absence of blood-borne parasites can be ascertained with the instrument of this invention.

A preferred embodiment of the instrument of this invention which is adapted for use in detecting the presence or absence of heartworm microfilariae in a sample of animal blood contained in a capillary tube is disclosed hereinafter. The instrument includes a self-contained illumination system with provision for appropriate filters for use with fluorescent stains added to the blood sample. The illumination system is capable of providing either trans- or epi-illumination of the specimen using the same light source. The specimen is contained in a capillary tube which is positioned on a novel stage disposed for viewing through an optically magnifying ocular lens system. The stage is formed from a piece of transparent material, such as acrylic plastic, glass, or the like and includes a slot cut into its upper surface, in which slot the specimen-containing capillary tube is disposed. The slot is preferably filled with a liquid, such as oil or water, which has a predetermined index of refraction so as to substantially eliminate or reduce the lensing effect of the curved surface of the capillary tube. A conventional cover slide is disposed over the slot when the tube is positioned therein. The capillary tube preferably projects from the confines of the instrument so that the tube can be manually manipulated during inspection of the specimen.

An additional advantage of this design is that the specimen viewing stage is contained in relatively light-proof enclosure. In the usual practice, it is necessary to keep a microscope used for viewing fluorescent-stained specimens in a darkened room because stray room light makes observation of the stained specimen difficult.

It is, therefore, an object of this invention to provide an instrument adapted for viewing sample specimens under optical magnification.

It is a further object of this invention to provide an instrument of the character described particularly adapted for viewing specimens contained in transparent capillary tubes.

It is an additional object of this invention to provide an instrument of the character described wherein the lensing effect of the capillary tube is reduced or eliminated for improved inspection of the sample contained in the capillary tube.

These and other objects and advantages of the invention will become more readily apparent from the following detailed description of a preferred embodiment of the invention, taken in conjunction with the accompanying drawings, in which.

Figure 1:
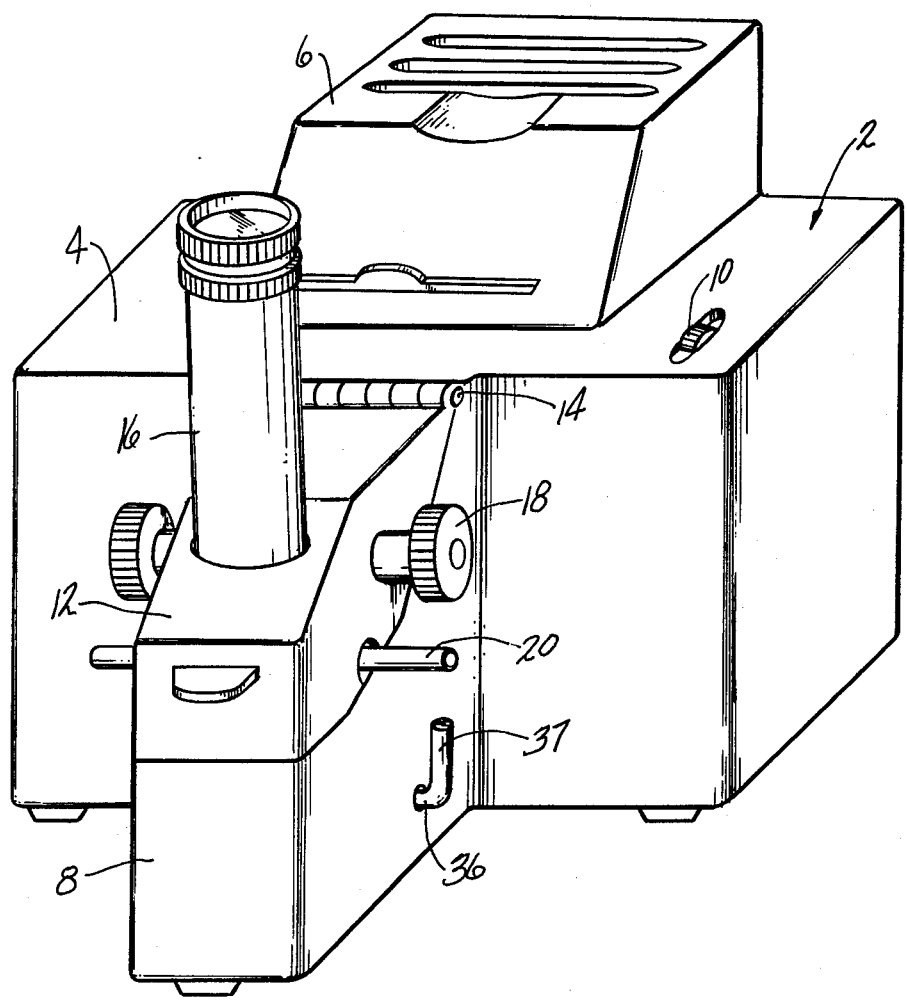
FIG. 1 is a frontal perspective view of a preferred embodiment of an instrument made in accordance with this invention.

Referring now to the drawings, FIG. 1 illustrates a preferred embodiment of an instrument, denoted generally by the numeral 2, formed in accordance with this invention. The instrument 2 includes a casing or housing 4 which has an upwardly projecting portion 6 and a forwardly projecting portion 8. An on-off switch 10 is mounted on the casing 4 for controlling the internal illuminator in the casing. Hinged to the forwardly projecting portion 8 is a cover 12 which can be pivoted about a hinge 14 to enable the instrument casing 4 to be opened to expose the specimen tray, which is inside of the casing. A lens tube 16 is mounted on the cover 12 and contains a specimen-viewing lens assembly. The lens assembly can be focussed by means of an adjustment knob 18. The specimen containing capillary tube 20 projects from the sides of the casing portion 6 for manual manipulation during viewing of the specimen.

Figure 2:
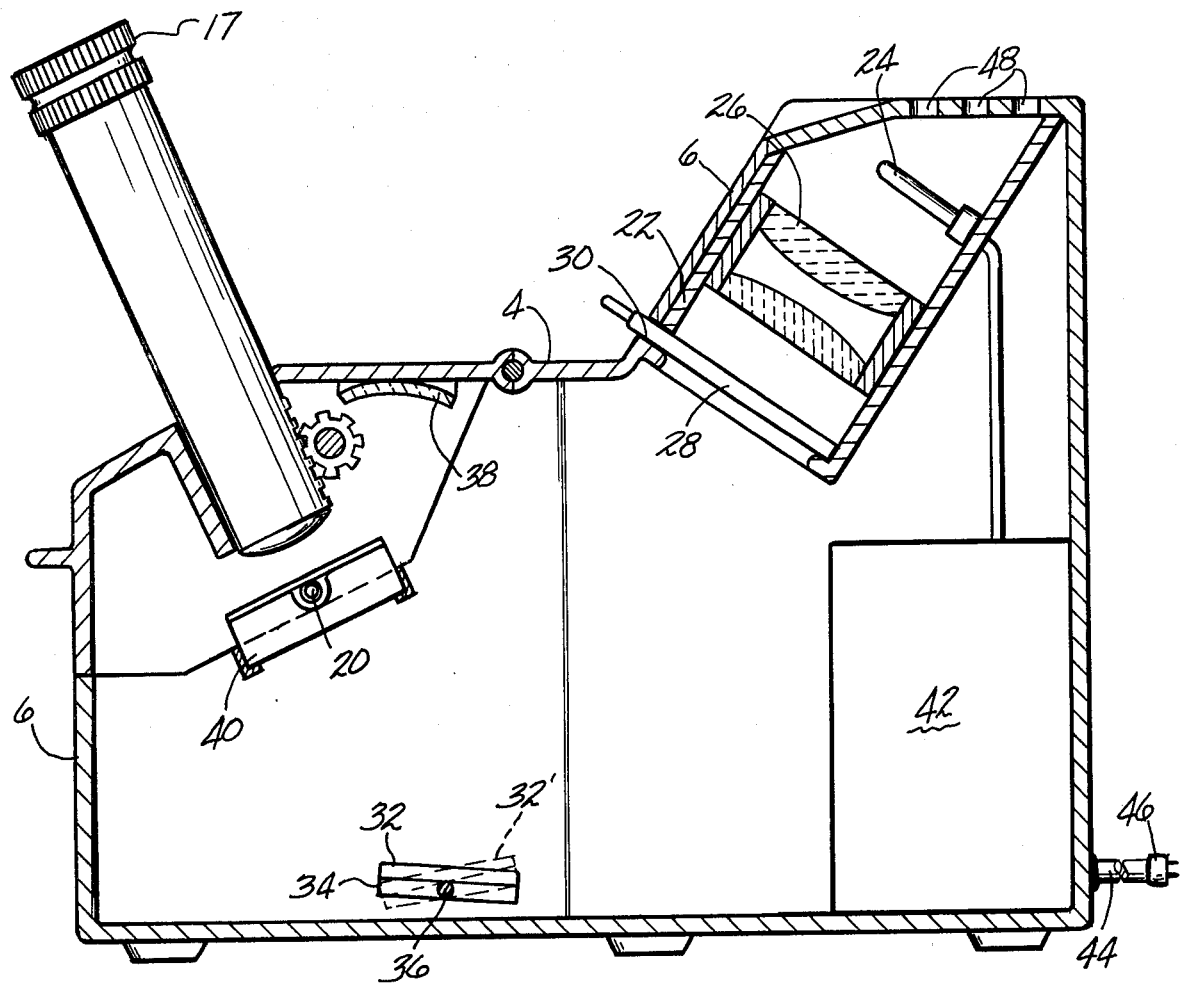
FIG. 2 is a vertical sectional view taken through the casing of the instrument of FIG. 1 showing the arrangement of the internal components thereof.

Referring now to FIG. 2, the internal components of the instrument are shown. Disposed within the upwardly projecting casing portion 6, there is a tubular support member 22 which contains a suitable lamp 24 for illumination of the specimen, and a condensing lens assembly 26 for properly focussing the light rays for illuminating the specimen. A suitable filter 28 is mounted in the support member 22 and extends through a slot 30 in the casing 4 so as to facilitate changing of the filter. The filter is used when a fluorescent highlighting stain has been added to the specimen sample to cause only the wavelength of light which most highly excites the fluorescent stain to strike the specimen, whereby maximum fluorescence is obtained.

In order to enhance the contrast when viewing a transilluminated specimen or to screen out the excitation wavelength when using dyes which fluoresce, a second filter may be removably disposed in the eyepiece assembly 17 of the viewing optics. This can take the form of a filter, mounted in a holder, which can be attached to, or removed from, the eyepiece.

Mounted near the bottom of the casing 4 is a first reflecting mirror 32 which is secured to a plate 34 and is pivotable about a rod 36. Referring to FIG. 1, it will be noted that the rod 36 projects from the side of the casing 2 and includes an upwardly turned handle 37 which facilitates rotation of the rod 36. Mounted on the inside of the upper wall of the casing portion 6 is a second reflecting mirror 38 which is arranged to reflect light from the first mirror 32 down onto the specimen contained in the capillary tube 20. The capillary tube is supported on a stage 40, the construction of which will be set forth in greater detail hereinafter.

It will be noted that the lamp 24 is electrically connected to a transformer 42 which obtains electrical power from a suitable electrical cord 44 having a suitable plug 46 thereon for connection to a power outlet. There are provided a plurality of slits 48 in the top of the casing adjacent to the lamp 24 for ventilating the interior of the casing and dissipating heat therefrom.

Figure 3:
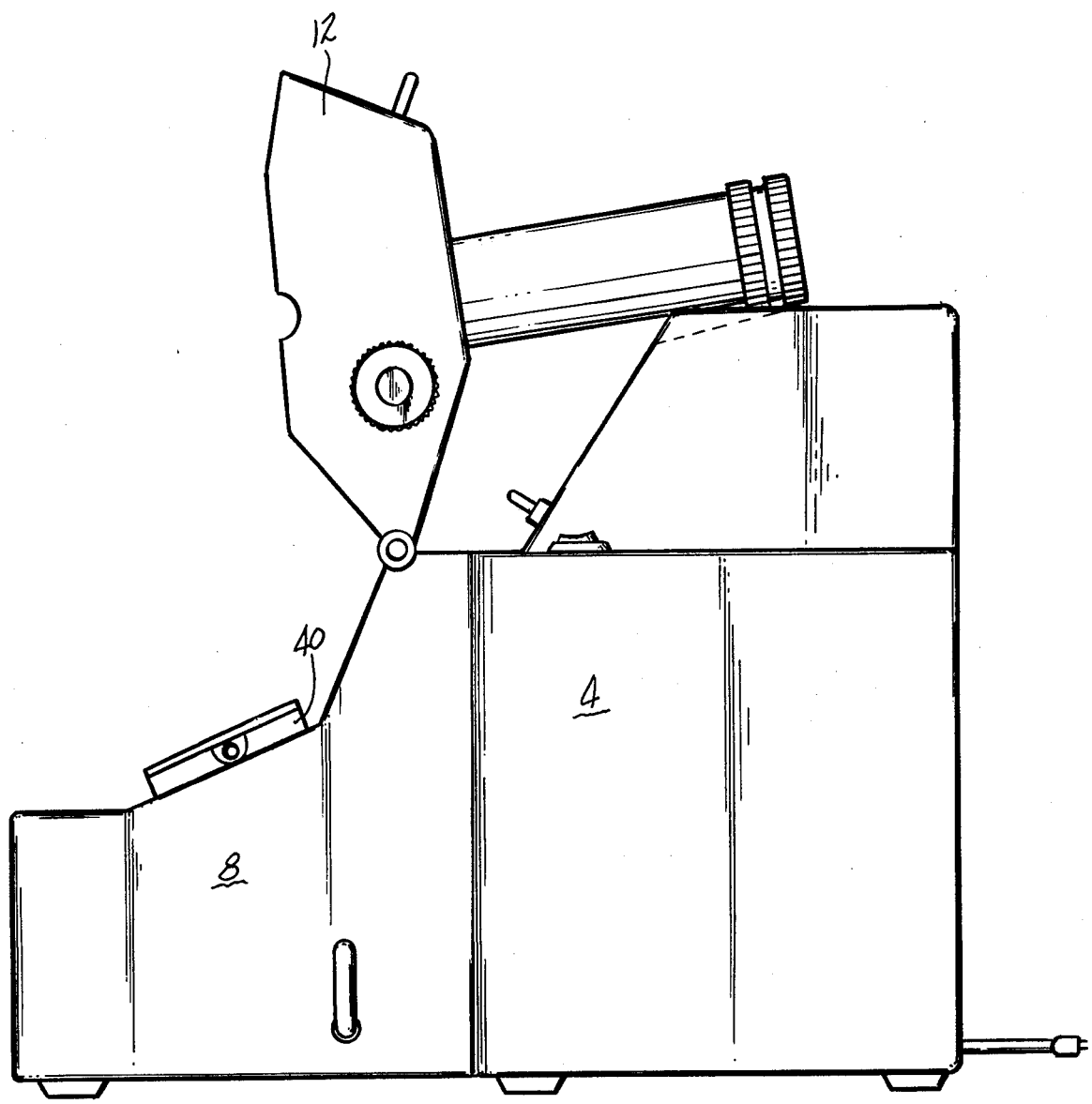
FIG. 3 is a side elevation view of the instrument of FIG. 1 showing how the instrument casing may be opened for access to the inside thereof.

Referring now to FIG. 3, there is shown the manner in which the cover 12 can be swung up away from the projecting portion 8 of the casing 4 to open the latter and expose the stage 40.

Figure 4:
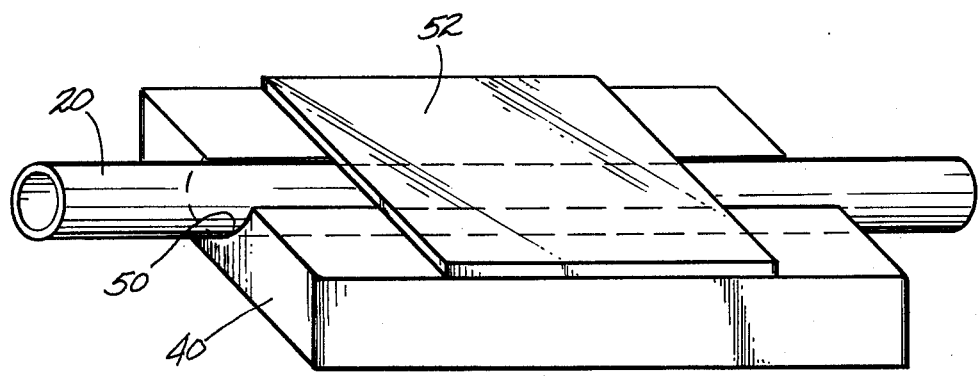
FIG. 4 is an enlarged perspective view of the part of the instrument which supports the specimen-containing capillary tube.

Referring now to FIG. 4, details of the stage 40 are shown. As previously noted, the stage 40 is formed from a piece of transparent material, such as acrylic plastic, glass, or the like. The capillary tube 20 which contains the specimen sample is positioned in a groove 50 which is open at both ends and which opens through the top surface of the stage 40. A conventional cover slide 52 is positioned on the top surface of the stage 40. The groove 50 is deep enough so that the capillary tube 20 will lie below a projection of the top surface of the stage 40. The groove 50 contains a suitable fluid such as oil, water, or the like which, when the capillary tube 20 is disposed in the groove 50, fills the remainder of the groove 50 up to the level of the top surface of the stage 40. The cover slide 52 then spreads the fluid in a thin film over the top surface of the stage 40. In this manner, the fluid serves to minimize the lens effect of the curved surface of the capillary tube 20 so that one can see more clearly into the specimen and observe more accurately the physical characteristics of blood cells, parasitic microfilariae, or the like other matter found in the specimen. The selection of the fluid is made by comparing the refractive index of the cover slide glass, the capillary tube glass and the fluid so that all are comparable. One specific fluid which has been found to provide good performance when used with a conventional capillary tube and cover glass is immersion oil.

It should be appreciated that the capillary tube holder could be molded from a transparent plastic, such as acrylic, with a through-hole into which can fit the capillary tube. Insofar as this method of producing the holder renders it difficult to clean, it would be expected that such a holder would be discarded after one or a few uses. The advantage of such a holder would be that there is only one piece to manipulate.

The instrument of this invention is capable of providing both epi- and trans-illumination of the specimen contained in the capillary tube. The mode of specimen illumination is controlled by the mirror 32. When the mirror 32 is in the position shown in FIG. 2, light from the lamp 24 is reflected by the mirror 32 to the mirror 38 and re-reflected by the mirror 38 down onto the stage 40 and capillary tube 20 to produce epiillumination of the tube 20 and specimen contained therein. In order to produce trans-illumination of the tube 20 and specimen, the mirror 32 will be rotated by means of the rod 36 and rod handle 37 in a counter-clockwise direction to the position 32' shown in phantom in FIG. 2, wherein light from the lamp 24 is reflected by the mirror 32 directly up toward the lower surface of the stage 40. The stage 40, being formed from relatively transparent material, diffuses the light so that the light rays from the mirror 32 are refracted and transmitted by the stage 40 into the capillary tube 20 and specimen from substantially all sides of the tube 20.

It will be appreciated that the instrument of this invention provides improved specimen-viewing capabilities for specimens which are contained in capillary tubes. The improved capabilities are provided by the substantial elimination of the lensing effect of the curved wall of the capillary tube and the multi-illumination feature.

Since many changes and variations of the disclosed embodiment of the invention may be made without departing from the inventive concept, it is not intended to limit the invention otherwise than as required by the appended claims.

What is claimed is:

1. An instrument for viewing samples which are contained in capillary tubes, said instrument comprising:
   (a) a closed housing;
   (b) a stage in said housing for holding the capillary tube, said stage comprising a block of transparent material having a groove for containment of the capillary tube, a transparent capillary tube in said groove, said groove opening through a surface of said block which surface is disposed for viewing by said optical system, said groove containing a liquid having substantially the same index of refraction as the material of the capillary tube, and means for conforming a surface of the liquid to a planar configuration;
   (c) an optical system for viewing the capillary tube;
   (d) a light source for producing light for illuminating the capillary tube; and
   (e) adjustable reflecting means in said housing for providing both trans- and epi-illumination of the capillary tube.

2. For use in an instrument for viewing samples which are contained in capillary tubes, a holder for the capillary tubes, said holder comprising a block of transparent material having a groove disposed therein, said groove having a side which opens through one side surface of said block, said groove being sized for containment of a capillary tube, a transparent capillary tube in said groove, and said groove being operative to also contain an amount of a liquid having substantially the same index of refraction as the material of the capillary tube; and transparent means for overlying the open side of said groove for imparting a planar surface to the liquid.

3. For use in an instrument for viewing samples which are contained in capillary tubes, a holder for the capillary tubes, said holder comprising a block of material having a groove disposed therein, said groove having a side thereof which opens through one side surface of said block, said groove being sized for containment of a capillary tube, a transparent capillary tube in said groove, and said groove being operative to contain an amount of a liquid having substantially the same index of refraction as the material of the capillary tube; and transparent means overlying the open side of said groove to impart a planar surface to the liquid.

4. An instrument for viewing samples which are contained in capillary tubes, said instrument comprising:
  (a) a closed housing;
  (b) a block in said housing, said block having a groove therein opening through one side of said block, said groove providing means for containing the capillary tube, a transparent capillary tube in said groove, and said groove further providing means for containing an amount of a liquid having substantially the same index of refraction as the material of the capillary tube;
  (c) an optical system for viewing the capillary tube through the liquid;
  (d) a light source for producing light for illuminating the capillary tube; and
  (e) transparent means overlying the open side of said groove for imparting a planar surface to the liquid.

5. The instrument of claim 4, wherein said block is made from transparent material.

6. The instrument of claim 5, further comprising reflecting means for providing epi- and trans-illumination of the capillary tube.

* * * * *